United States Patent
Hannuksela et al.

(10) Patent No.: US 7,206,456 B2
(45) Date of Patent: Apr. 17, 2007

(54) VIDEO CODING AND DECODING

(75) Inventors: Miska Hannuksela, Tampere (FI); Ye-Kui Wang, Tampere (FI)

(73) Assignee: Nokia Corporation, Espoo (FI)

(*) Notice: Subject to any disclaimer, the term of this patent is extended or adjusted under 35 U.S.C. 154(b) by 708 days.

(21) Appl. No.: 10/303,824

(22) Filed: Nov. 26, 2002

(65) Prior Publication Data

US 2003/0112867 A1    Jun. 19, 2003

(30) Foreign Application Priority Data

Nov. 27, 2001   (GB)   ................................ 0128359.7

(51) Int. Cl.
*G06K 9/36* (2006.01)
*G06K 9/46* (2006.01)

(52) U.S. Cl. ...................... 382/243; 382/232; 382/173; 382/196; 382/280; 375/240.08; 375/240; 348/384.1

(58) Field of Classification Search ................ 382/243, 382/232, 233, 236, 239, 225, 173, 192, 305, 382/196; 375/240.01, 240.08, 240.25, 240.29, 375/240.27, 122; 348/384.1, 420.1, 404.1, 348/407.1, 413.1, 402.1, 429.1
See application file for complete search history.

(56) References Cited

U.S. PATENT DOCUMENTS

| | | | | |
|---|---|---|---|---|
| 6,157,733 A * | 12/2000 | Swain | ......................... | 382/154 |
| 6,584,229 B1 * | 6/2003 | Lim et al. | .................... | 382/243 |
| 6,801,661 B1 * | 10/2004 | Sotak et al. | ................. | 382/203 |
| 6,909,745 B1 * | 6/2005 | Puri et al. | .............. | 375/240.01 |
| 2001/0019631 A1 * | 9/2001 | Ohsawa et al. | ............. | 382/242 |
| 2002/0075956 A1 * | 6/2002 | Haskell et al. | ......... | 375/240.12 |

(Continued)

FOREIGN PATENT DOCUMENTS

GB   2 322 509 A   8/1998

(Continued)

OTHER PUBLICATIONS

ITU-T Recommendation H.263 (Feb. 1998); Series H: Audiovisual And Multimedia Systems, Infrastructure of audiovisual services—Coding of moving video "Video Coding for Low Bit Rate Communication" pp. 1-153.

(Continued)

*Primary Examiner*—Jingge Wu
*Assistant Examiner*—Ali Bayat
(74) *Attorney, Agent, or Firm*—Foley and Lardner LLP (57) ABSTRACT

A video coding and decoding method, wherein a picture is first divided into sub-pictures corresponding to one or more subjectively important picture regions and to a background region sub-picture, which remains after the other sub-pictures are removed from the picture. The sub-pictures are formed to conform to predetermined allowable groups of video coding macroblocks (MBs). The allowable groups of MBs can be, for example, of rectangular shape. The picture is then divided into slices so that each sub-picture is encoded independent of other sub-pictures except for the background region sub-picture, which may be coded using another sub-pictures. The slices of the background sub-picture are formed in a scan-order with skipping over MBs that belong to another sub-picture. The background sub-picture is only decoded if all the positions and sizes of all other sub-pictures can be reconstructed on decoding the picture.

13 Claims, 5 Drawing Sheets

U.S. PATENT DOCUMENTS

2002/0191846 A1* 12/2002 Crinon et al. ............... 382/173
2003/0035479 A1* 2/2003 Kan et al. ............. 375/240.12
2004/0240554 A1* 12/2004 Murakami et al. ..... 375/240.16

FOREIGN PATENT DOCUMENTS

| GB | 2 350 512 A | 11/2000 |
|----|-------------|---------|
| GB | 2 350 515 A | 11/2000 |
| WO | 9844739     | 10/1998 |
| WO | 9919839     | 4/1999  |
| WO | 9949412     | 9/1999  |
| WO | 9966731     | 12/1999 |
| WO | 0022832     | 4/2000  |

OTHER PUBLICATIONS

Network Working Group, Request for Comments: 2733, Category: Standards Track; J. Rosenberg & H. Schulzrinne; Dec. 1999; "An RTP Payload Format for Generic Forward Error Correction"; pp. 1-25.

LBC-96-213 (Jul. 1996); ITU Telecommunication Standardization Sector; Study Group 15,n Working Party 15/1; Experts Group on Very Low Bitrate Video Telephony; "Proposal on Using Region Layer in H362+".

ITU-T; H.323 Annex R (Jul. 2001); Series H: Audiovisual And Multimedia Systems; Packet-based multimedia communications systems; Annex R: Robustness methods for H.323 entities.

ITU—Telecommunications Standardization Sector; Study Group 16 Question 6; Video Coding Express Group (VCEG); Document VCEG-m77; Filename: VCEG-M77.doc; Generated: May 1, 2001; "Common Test Conditions for RTP/IP Over 3GPP/3GPP2".

ITU- Telecommunications Standardization Sector; Study Group 16; Video Coding Experts Group (VCEG); Document VCEG-N10; Filename: VCEG-N10.doc; Generated: Jul 10, 2001; "H.26L Test Model Long Term No. 8 (TML-8) draft0".

ITU- Telecommunications Standardization Sector; Study Group 16 Question 6; Video Coding Experts Group (VCEG); document VCEG-N52; Filename: VCEG-N52.doc; Generated: Sep. 18, 2001; H.26L.

ITU-Telecommunications Standardization Sector; Study Group 16 Question 6; Video Coding Express Group (VCEG); Document VCEG-N79rl; Filename: VCEG-N79rl.doc; Gennerated: Sep. 27, 2001; "Common Conditions for I Wire-Iine, Low Delay IP/UDP/RTP Packet Loss Resilient Testing".

ITU-Telecommunications Standardization Sector; Study Group 16 Question 6; Video Coding Experts Group (CEG); Document VCEG-N72rl' Filename: VCEG-N72rl.doc; Generated: Sep. 26, 2001; "H26L over IP Framework:Proposed H.25L NAL Normative Text".

ITU-Telecommunications Standardization Sector; Study Group 16 Question 6; Video Coding Experts Group (CEG); Document VCEG-N62 Filename: VCEG-N62.doc; Generated: Sep. 18, 2001; NON-.

GB Search Report; Date of Search May 27, 2002.

* cited by examiner

|   |   |   |     |   |   |   |   |   |    |
|---|---|---|-----|---|---|---|---|---|----|
| 0 | 1 | 2 | ... |   |   |   |   |   | 9  |
| 10| 11| 12| ... |   |   |   |   |   | 19 |
| 20| 21| 22| ... |   |   |   |   |   | 29 |
| 30| 31| ... |   |   |   |   |   |   | 39 |
| 40| ... |   |   |   |   |   |   |   | 49 |
| 50| ... |   |   | 54|   | 56|   |   | 59 |
| 60| ... |   |   |   |   |   |   |   | 69 |
| 70| ... |   |   |   |   |   |   |   | 79 |

VIDEO CODING AND DECODING

FIELD OF THE INVENTION

This invention relates to video coding and decoding. It relates particularly, but not exclusively, to video coding and transmission over error-prone data connections.

BACKGROUND OF THE INVENTION

Video transmission requires coding of the video in a form that allows its transmission. Typically, this involves effective compression due to the vast amount of information contained in a stream of pictures that constitute a video to be transmitted.

ITU-T H.263 is an International Telecommunications Union (ITU) video coding recommendation which specifies the bit-stream syntax and the decoding of a bit-stream. In this standard, pictures are coded using luminance and two colour difference (chrominance) components (Y, CB and CR). The chrominance components are each sampled at half resolution along both co-ordinate axes compared to the luminance component.

Each coded picture, as well as the corresponding coded bit stream, is arranged in a hierarchical structure with four layers being, from top to bottom, a picture layer, a picture segment layer, a macroblock (MB) layer and a block layer. The picture segment layer can be either a group of blocks layer or a slice layer.

The picture layer data contains parameters affecting the whole picture area and the decoding of the picture data. By default, each picture is divided into groups of blocks. A group of blocks (GOB) typically comprises a row of macroblocks (16 subsequential pixel lines) or a multiple thereof. Data for each GOB consist of an optional GOB header followed by data for MBs. Alternatively to GOBs, so called slices can be used, whereby each picture is divided into slices instead of GOBs. Data for each slice consists of a slice header followed by data for MBs.

The slices define regions within a coded picture. Each region is a number of MBs in a normal scanning order. There are no prediction dependencies across slice boundaries within the same coded picture. However, temporal prediction can generally cross slice boundaries unless ITU-T H.263 Annex R (Independent Segment Decoding) is used. Slices can be decoded independently from the rest of the picture data (except for the picture header). Consequently, slices improve error resilience in packet-lossy networks.

Each GOB or slice is divided into MBs. An MB relates to 16×16 pixels of luminance data and the spatially corresponding 8×8 pixels of chrominance data. In other words, an MB consists of four 8×8 luminance blocks and two spatially corresponding 8×8 chrominance blocks.

Rather than using regions formed of a number of MBs in the normal scan order, rectangular regions consisting of N×M macroblocks (N, M greater than or equal to one) and substituting slice and GOB structures were proposed to the ITU-T H.263 by Sen-ching Cheung, "Proposal on using Region Layer in H.263+", ITU-T SG15 WP1 document LBC-96-213, July 1996. However, the proposal was not adopted for H.263.

In ITU-T H.263 Independent Segment Decoding mode (ITU-T H.263 Annex R), segment boundaries (as defined by the boundaries of the slices or the upper boundaries of the GOBs for which GOB headers are sent, or the boundaries of the picture, whichever bounds a region in the smallest way) are treated similarly to picture boundaries, which eliminate all error propagation from neighboring slices. For example, errors cannot be propagated due to motion compensation or de-blocking loop filtering from neighboring slices. Segment boundaries can only be changed at INTRA pictures, i.e. when no inter-coding is required.

The ISO/IEC standard draft 14496-2:1999(E), referred to as MPEG-4 visual or MPEG-4 video, is a standard draft that has a design centered around a basic unit of content called an audio-visual object (AVO). Examples of AVO's are a musician (in motion) in an orchestra, the sound generated by that musician, the chair she is sitting on, the (possibly moving) background behind the orchestra, and explanatory text for the current passage. In the MPEG-4 video, each AVO is represented separately and becomes the basis for an independent stream.

The coding of natural two-dimensional motion video is a part of the MPEG-4 video. MPEG-4 video is capable of coding both conventional rectangular video objects as well as arbitrarily shaped two-dimensional video objects. The basic video AVO is called a video object (VO). The VOs can be scalable, i.e. they may be split up, coded, and sent in two or more video object layers (VOL). One of these VOLs is called the base layer, which all terminals must receive in order to display any kind of video. The remaining VOLs are called enhancement layers, which may be expendable in case of transmission errors or restricted transmission capacity. In case of non-scalable video coding, one VOL per VO is coded.

A snapshot in time of a video object layer is called a video object plane (VOP). For a rectangular video, this corresponds to a picture or a frame. However, in general, the VOPs can have an arbitrary shape. Each VOP can be divided into video packets. Each VOP and video packet is further divided into macroblocks similarly to ITU-T H.263. The colour (YUV) information of the macroblock is coded similarly to ITU-T H.263, i.e., the macroblock is further divided into 8×8 blocks. In addition, if the VOP has an arbitrary shape, the shape of the macroblock is coded as explained in the next paragraph.

The MPEG-4 video VOs may be of any shape, and furthermore the shape, size, and position of the object may vary from one frame to the next. In terms of its general representation, a video object is composed of three colour components (YUV) and an alpha component. The alpha component defines the object's shape on a picture-by-picture basis. Binary objects form the simplest class of objects. They are represented by a sequence of binary alpha maps, i.e. 2-dimensional pictures where each pixel is either black or white. MPEG-4 video provides a binary shape only mode for compressing these objects. The compression process is defined exclusively by a binary shape encoder for coding the sequence of alpha maps. In addition to binary objects, a grey-level alpha map can be used to define the opacity of the object. The object boundary is coded using a binary alpha map, while the grey-level alpha information is coded similarly to texture coding using the DCT transform. In addition to the sequence of object shape and opacity definitions, the representation comprises the colours of all the pixels within the interior of the object shape. MPEG-4 video encodes these objects using a binary shape encoder and then a motion compensated discrete cosine transform (DCT)-based algorithm for the interior texture coding.

It is also known to be advantageous to segment a video bit-stream into portions of different priorities, for example by scalable video coding, data partitioning, or region-based coding discussed above.

Scalable video coding and data partitioning suffer, however, from dependencies between different coding elements. An enhancement layer, for example, cannot be decoded correctly if the base layer has not been received correctly. Correspondingly, a low-priority partition is of no use if the corresponding high-priority partition has not been received. This makes the use of scalable video coding and data partitioning disadvantageous in some cases. Scalable coding and data partitioning do not provide means to handle spatial regions of interest differently from subjectively less important areas. Moreover, many forms of scalable coding, such as conventional signal to noise ratio (SNR) and spatial scalability, suffer from a worse compression efficiency compared to non-scalable coding. In the region-based video coding, on the other hand, the GOBs or slices may contain macroblocks of different subjective importance. Thus, no prioritisation of GOBs and slices is typically possible.

Coding of arbitrarily shaped objects is currently considered too complex for handheld devices. This is further exemplified by the fact that MPEG-4 video shape coding tools are typically excluded from mobile video communication services of the planned third generation mobile telephones.

SUMMARY OF THE INVENTION

It is an object of the invention to provide an alternative suitable for mobile communication which yet provides at least some of the advantages similar to those offered by MPEG-4 video.

According to a first aspect of the invention there is provided a method of video encoding comprising the steps of:
dividing a picture into a set of regular shaped coding blocks having a predetermined alignment in relation to the area of the picture, each coding block corresponding to at least one group of elementary coding elements;
determining at least one shape within a picture;
selecting at least one subset of the coding blocks defining at least one area covering the at least one determined shape;
determining as at least one separate coding object the selected at least one subset of the coding blocks;
determining as a background object the part of the picture that excludes the at least one separate coding object;
encoding the at least one separate coding object; and
encoding as one coding object the background object.

It is an advantage of the invention that a background coding object can be determined as a unitary coding object that is defined as the part of the picture that does not belong to any separate coding object and that the separate coding objects need not conform to the shapes which they cover.

Preferably, the background coding object is coded using the at least one separate coding object.

The background object cannot be reconstructed without determination of the position, shape and size of each separate coding object. If any data packet carrying a separate coding object is lost, there is no chance to decode the background coding object anyway. The determination of the position and size of the at least one separate coding object indicates the presence of video data of the at least one separate coding object. There is thus a high likelihood to successful prediction of a background coding object using the at least one separate coding object, so that it is typically reasonable to encode the background coding object using the at least one separate coding object.

Preferably, the video encoding the background coding object further comprises the sub-step of defining coding slices in a scan-order so that the slices are composed by consecutive coding blocks skipping those basic coding objects which are included in the at least one separate coding object.

Preferably, the scan-order is scanning first one horizontal line and then vertically proceeding to a next horizontal line. Alternatively, the scan order is scanning first one vertical line and then horizontally proceeding to a next vertical line. Yet alternatively, any other scan order may be used.

Preferably, the video encoding the at least one separate coding object further comprises the sub-step of defining within each separate coding object coding slices in a scan-order so that the slices are composed in the scan-order of coding blocks included in the at least one separate coding object.

It is an advantage of the invention that objects of high subjective interest can be video encoded separately from the background with reduced computational requirements, as the area defined for a shape conforms to the predetermined alignment of the coding blocks.

Preferably, the coding blocks are macroblocks.

Preferably, the area covering the at least one determined shape is a rectangular area, whereby square is one subset of rectangles.

Preferably the separate coding objects are defined in a descending order of subjective importance.

Preferably, a subjectively less important separate coding object entirely excludes the coding blocks that define the area covering the at least one determined shape corresponding to a subjectively more important separate coding object. This allows automatic clipping of overlapping corners of a rectangular area defined by a subjectively less important coding object in case they would otherwise overlap with any area defined by a subjectively more important area.

Preferably, the video encoding of the at least one separate coding object is independent of the video encoding of the background object so as to inhibit error propagation into the at least one separate coding object.

The use independent video encoding of the at least one separate coding object enhances the robustness of the video encoding, although then the position of the at least one separate coding object cannot be changed without sending an intra-picture that is not based on earlier pictures.

Alternatively, the video encoding of the at least one separate coding object is allowed to depend on the video encoding of the background object and on any other of the at least one separate coding object.

This embodiment basically causes a sub-picture boundary of the at least one separate coding object be treated as a slice boundary. The position and size of the at least one separate coding object may then be changed even if the at least one separate coding object is being inter-coded.

Preferably, the video encoding of the background object is allowed to use the at least one separate coding object so as to enhance video compression efficiency.

Preferably, the method further comprises the step of determining information characterising the position and size of the at least one separate coding object for use in decoding the picture.

Preferably, the step of determining information characterising the size of the at least one separate coding object comprises the sub-step of computing a reference width based on the width of the picture and expressing the width of the at least one separate coding object using the reference width.

Preferably, the step of determining information characterising the size of the at least one separate coding object comprises the sub-step of computing a reference height based on the height of the picture and expressing the height of the at least one separate coding object using the reference height.

Preferably, the method further comprises the step of characterising the type of each of the at least one separate coding object for use in decoding the picture.

Preferably, the method further comprises the step of assigning a different identifier to the at least one separate coding object for correlating each of the at least one separate coding object and corresponding characteristics.

Preferably, the video encoding of the at least one separate coding object uses a higher quantisation step density than the video encoding of the background object.

Preferably, the method further comprises the step of error protecting the at least one separate coding object against data corruption.

Preferably, the method further comprises the step of error protecting the background object against data corruption.

Preferably, the at least one separate coding object is more error protected against data corruption than the background object.

Preferably, unequal error protection is used to prioritise data packets containing information related to the at least one separate coding object.

Preferably, the determining at least on shape within a picture is based on its appearance.

Alternatively, the determining at least one shape within a picture is based on choosing uniform motion fields.

According to a second aspect of the invention there is provided a method of video decoding a picture coded by a set of coding blocks, each coding block corresponding to at least one group of the elementary coding elements and the coding blocks having a predetermined alignment in relation to the area of the picture, the method comprising the steps of:
  determining at least one separate coding object corresponding to at least one subset of the coding blocks defining at least one part of a picture being decoded;
  determining as a background object the subset of the coding blocks that corresponds to the part of the picture that excludes the at least one separate coding object;
  decoding the at least one separate coding object; and
  decoding the background object.

Preferably, the method further comprises determining video decoding slices for the background object, comprising the sub-steps of forming a decoding slice of consecutive coding blocks and skipping the coding blocks which belong to the at least one separate coding object.

Preferably, each of the at least one subset of coding blocks define a rectangular sub-picture, whereby square is a sub-set of rectangles.

Preferably, the coding blocks are macroblocks.

Preferably, the video decoding of the at least one separate coding object is independent of the video decoding of the background object.

It is an advantage of the method that it may be used for various applications such as for prioritised transportation of subjectively important regions. In addition, it allows "picture resolution scalability", i.e. the picture can be scaled to fit onto a display having a resolution too small for the full picture, by decoding only a separate coding object of a suitable size.

Preferably, the video decoding of the background object is allowed to use the at least one separate coding object.

Even more preferably, the background object is predicted spatially, parametrically, and/or temporally from the at least one separate object to make processing simpler.

Preferably, the at least one separate object corresponds to at least one foreground region sub-picture.

It is an advantage of the prediction based on at least one separate object that the background objects often are subjectively of limited significance. The information of the at least one separate object can thus be used so as to further enhance the video compression, as possible error propagation from foreground region sub-pictures to the background object may not degrade the subjective picture quality excessively.

Preferably, the method further comprises the step of determining the position and size of the at least one separate coding object.

Preferably, the step of determining the size of the at least one separate coding object comprises the sub-step of computing a reference width based on the width of the picture and determining the width of the at least one separate coding object using the reference width.

Preferably, the step of determining the size of the at least one separate coding object comprises the sub-step of computing a reference height based on the height of the picture and determining the height of the at least one separate coding object using the reference height.

Preferably, the method further comprises the step of determining the type of each of the at least one separate coding object.

Preferably, the video decoding of the at least one separate coding object uses a higher quantisation step density than the video decoding of the background object.

Preferably, the method further comprises the step of detecting a loss of the at least one separate coding object.

Preferably, the method of detecting a loss of the at least one separate coding object is based on enumeration of the separate coding objects with a pre-defined value for the first at least one separate coding object and with a pre-defined increment or decrement from one separate coding object to another.

A lack of any expected object number then allows a decoder to detect a loss of the corresponding separate coding object.

Preferably, the method further comprises decoding the at least one separate coding object separately from other of other coding objects.

Preferably, the method further comprises the step of error correction decoding the at least one separate coding object.

Preferably, the method further comprises the step of error correction decoding the background object.

It is an advantage of prioritising subjectively most important parts of the video bit-stream that a better subjective picture quality can be reached compared to equal transport and error protection of all parts of the bit-stream.

According to a third aspect of the invention there is provided a video encoder comprising:
  means for dividing a picture into a set of regular shaped coding blocks having a predetermined alignment in relation to the area of the picture, each coding block corresponding to at least one group of elementary coding elements;
  means for determining at least one shape within a picture;
  means for selecting at least one subset of the coding blocks defining at least one area covering the at least one determined shape;

means for determining as at least one separate coding object the selected at least one subset of the coding blocks;

means for determining as a background object the part of the picture that excludes the at least one separate coding object;

means for encoding the at least one separate coding object; and means for encoding as one coding object the background object.

According to a fourth aspect of the invention there is provided a video decoder for video decoding a picture coded by a set of coding blocks, each coding block corresponding to at least one group of the elementary coding elements and the coding blocks having a predetermined alignment in relation to the area of the picture, the decoder comprising:

means for determining at least one separate coding object corresponding to at least one subset of the coding blocks defining at least one part of a picture being decoded;

means for determining as a background object the part of the picture that excludes the at least one separate coding object;

means for decoding the at least one separate coding object;

means for decoding the background object.

According to a fifth aspect of the invention there is provided a computer program product comprising computer executable program means for causing an apparatus to implement the method of the first aspect.

According to a sixth aspect of the invention there is provided a computer program product comprising computer executable program means for causing an apparatus to implement the method of the second aspect.

According to a seventh aspect of the invention there is provided an apparatus comprising the video encoder of the third aspect.

According to a eighth aspect of the invention there is provided an apparatus comprising the video decoder of the fourth aspect.

Preferably, the apparatus of the aspects three to eight is selected from a group consisting of: a mobile communication device, a wireless communication device, a gaming device, a video recording device, a video output device, a communication network server, a communication network gateway, a personal computer, a portable computer, and a personal digital assistant device.

According to a ninth aspect of the invention there is provided a video signal comprising:

a plurality of compressed video coding blocks corresponding to at least one separate coding object corresponding to a part of a video encoded picture, the part of the video encoded picture having a variable size and position;

at least one identifier corresponding to the at least one separate coding object;

at least one position and size information corresponding to the at least one separate coding object; and a plurality of compressed video coding blocks corresponding to a background object that corresponds to a set of coding blocks that corresponds to the video encoded picture excluding the at least one separate coding object.

Various embodiments of the present invention have been illustrated only with reference to the one aspect of the invention for sake of briefness, but it should be appreciated that corresponding embodiments may apply to other aspects as well.

BRIEF DESCRIPTION OF THE DRAWINGS

The invention will now be described, by way of example only, with reference to the accompanying drawings, in which.

DETAILED DESCRIPTION

A preferred embodiment of the invention may be considered as supplementing the ITU-T H.26L by adding a sub-picture coding layer between picture and slice layers. The sub-picture coding layer shall form so-called sub-pictures (SP) which are typically rectangular (foreground region SPs or FR SPs) except for the so-called background region (BR) SP. The BR SP consists of the picture area not falling to any of the rectangular SPs. All SPs are first coded in scan-order, i.e. the slices start from the SPs and the slices are typically chosen following the order of subjective priorities so that the subjectively most important SPs are coded first and the BR SP is coded last. The SPs do not overlap, i.e. the entire encoded picture consists of all SPs.

Figure 1:
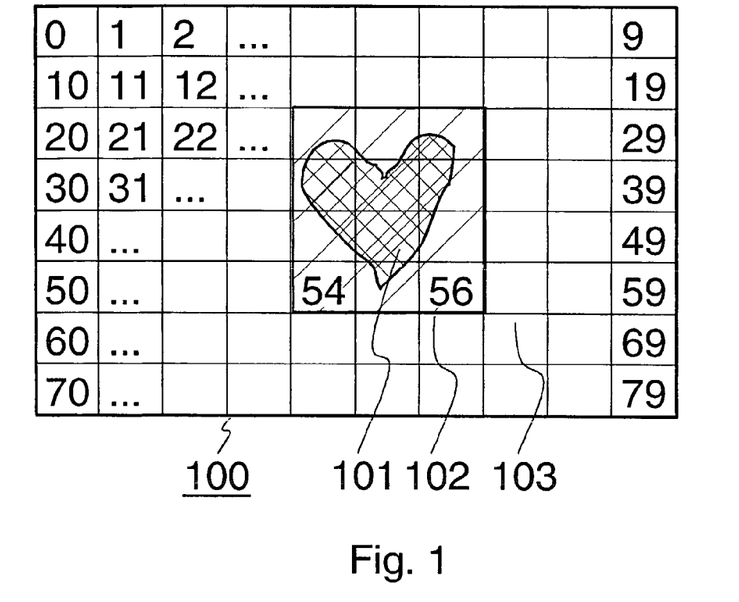
FIG. 1 shows a picture to be encoded in relation to macroblocks defined for video encoding.

FIG. 1 shows a picture 100 to be encoded in relation to macroblocks (MBs) defined for video encoding. The picture comprises a heart (of a drawn animation) that is considered as a foreground object 101 that is of a main interest. A rectangular foreground region sub-picture (FR SP) 102 has been drawn around the foreground object along the MB borders. Surrounding the foreground object 101, the picture also has a background. The portion of the background that surrounds the FR SP 102 is referred to as the background region sub-picture 103 (BR SP). Notice that also part of the background may belong to the FR SP 102, as is the case here. FIG. 1 also shows the MBs assigned in ascending order numbered as 0 to 79 where the first MB (0) is at the left-hand side upper corner and numbering grows to the right and continues after each row from the left of the next row.

Figure 2:
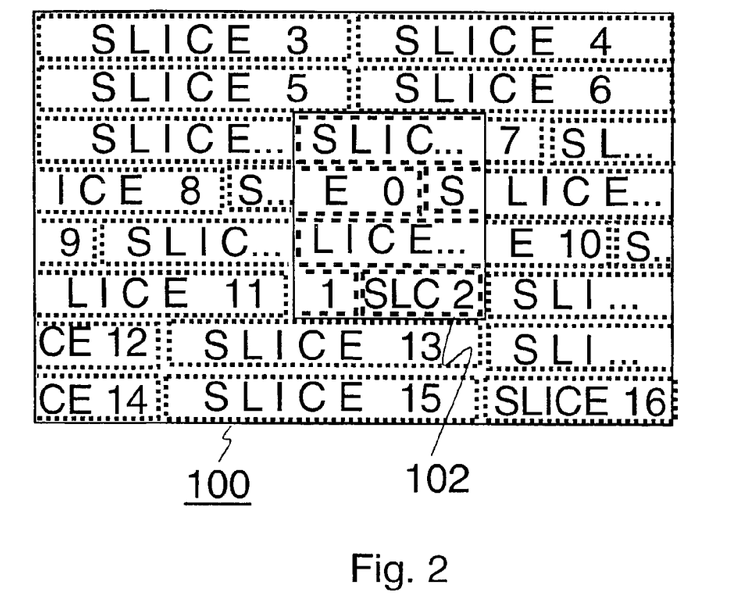
FIG. 2 shows a principal drawing of video coding slices formed for the picture of FIG. 1 according to a preferred embodiment of the invention.

FIG. 2 shows a principal drawing of video coding slices formed for the picture of FIG. 1 according to a preferred embodiment of the invention. The picture is segmented into video coding slices using a slice size of 5 macroblocks. The segmentation is started from the most important FR SP and the BR SP is segmented into slices after all the FR SPs (in FIGS. 1 and 2 only one FR SP is present). The slices are given running slice numbers starting from 0. Notice that slice 0 occupies 3 MBs from the first row within the FR SP and then 2 MBs of the second row within the FR SP, and particularly that the last slice of the FR SP is closed before the BR SP is encoded. The MBs in the BR SP are then segmented into slices in the scan-order so that each slice but the last one is generally composed of the maximum number of MBs allowed for one slice. The slices simply skip over each FR SP. Larger slices generally result in smaller amount of redundancy required to encode a picture.

Figure 3:
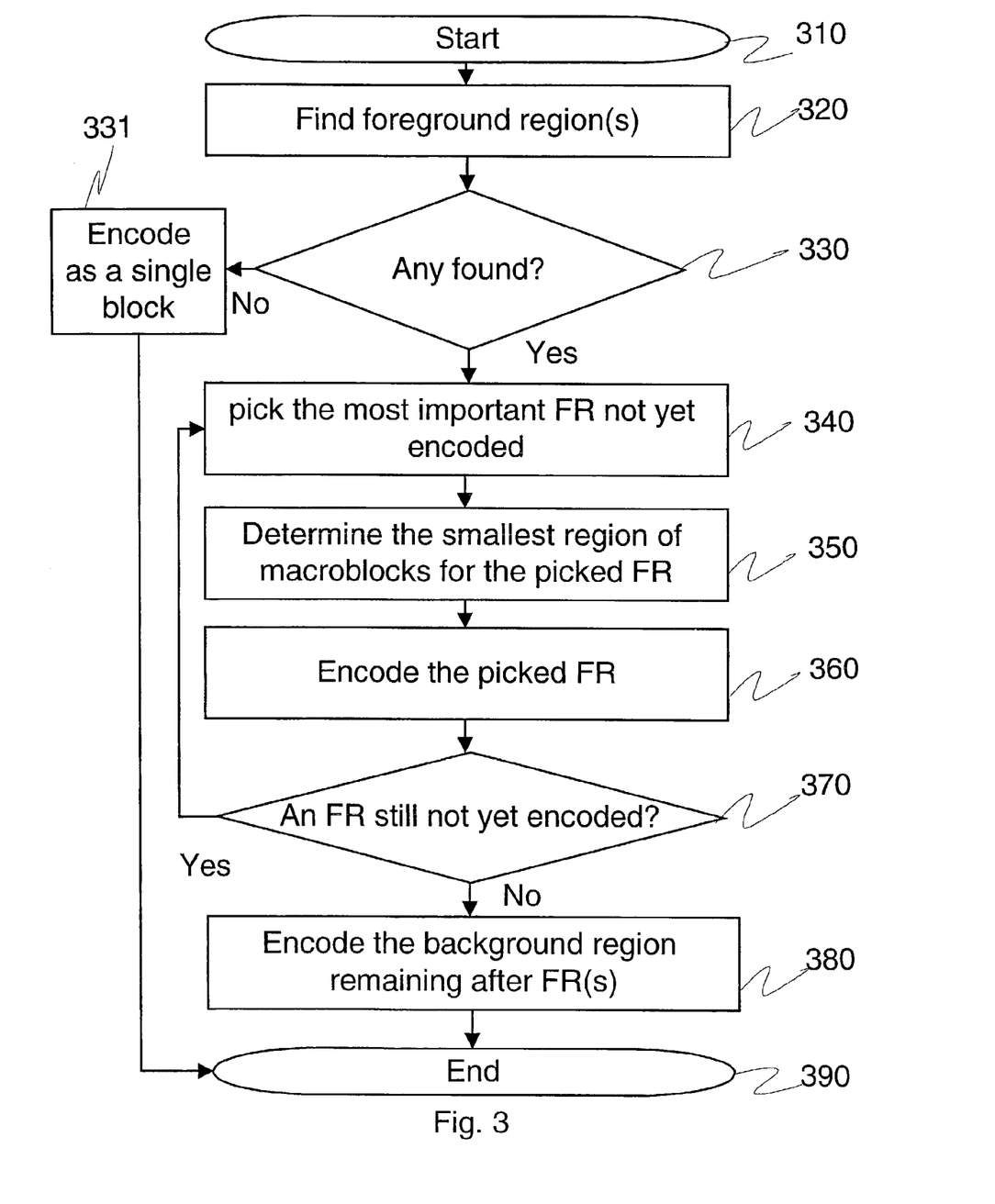
FIG. 3 shows a flowchart of the video encoding of a picture according to the preferred embodiment of the invention.

FIG. 3 shows a flowchart of the video encoding process according to the preferred embodiment of the invention. The flowchart starts from block 310, wherein a video encoded picture has been received.

After start, the process continues to block 320, where it is attempted to find one or more foreground object 101. Block 330 then checks if any foreground object 101 has been found. If no, block 331 encodes the picture as a single encoding block and the process ends. If yes, block 340 picks the most important foreground object 101 that has not yet been encoded. Block 350 then determines the smallest possible region of macroblocks (FR SP 102) that covers the picked foreground object 101. Typically, the possible regions are limited to those of a predetermined shape, such as rectangle shapes (including squares), as this shape provides simple video coding and decoding that suits well for portable devices. In alternative embodiments of the invention, different other predetermined shapes of the possible regions can be used, provided that a mechanism is agreed for the video encoder to inform the decoder of the shape used.

In block 360, FR SP 102 is then video encoded. After that, block 370 checks if there is still a foreground object 101 not yet encoded. If yes, the process returns to block 340, otherwise it proceeds to block 380. In block 380 the BR SP, i.e. the MBs not belonging to any FR SP, is video encoded. The process then ends in block 390.

In an alternative embodiment, Block 350 determines the smallest possible region of macroblocks (FR SP 102) that covers the picked foreground object 101 in a series of consecutive pictures. In a yet another alternative embodiment, block 350 determines the smallest possible region of macroblocks such that it reserves an amount of room around the picked foreground object. In even further alternative embodiment, the possible region of macroblocks is of a predetermined size and/or shape.

Figure 4:
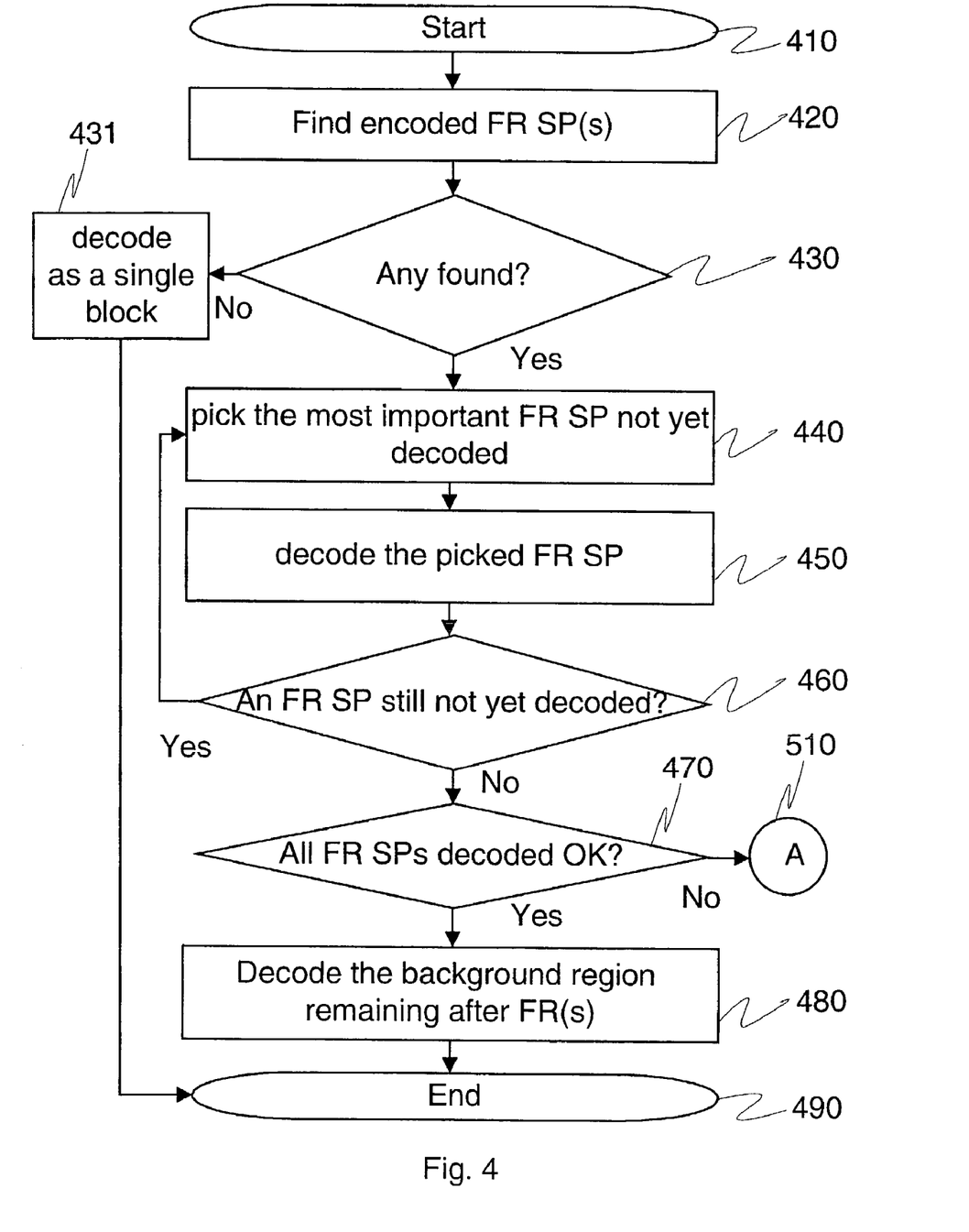
FIG. 4 shows a flowchart of the decoding of a picture according to the preferred embodiment of the invention.

FIG. 4 shows a flowchart of the decoding process according to the preferred embodiment of the invention. The process starts from block 410, where encoded video information corresponding to a video encoded picture has been received. In block 420 the decoder then attempts to find any encoded FR SPs. In block 430 it is checked if any FR SPs were found. If no, it is then attempted to decode the picture as a single coding object in block 431, otherwise the process continues to block 440. Block 440 picks the most important FR SP that has not yet been decoded. In block 450 the picked FR SP is then decoded and block 460 checks if there is still an FR SP not yet decoded. If yes, the process returns to block 440, otherwise it proceeds to block 470. In block 470, it is checked if all the FR SPs have been correctly decoded. If no, the process continues from block A shown in FIG. 5. If yes, the process proceeds to block 480, wherein the BR SP is decoded. After this, the process ends in block 490.

Figure 5:
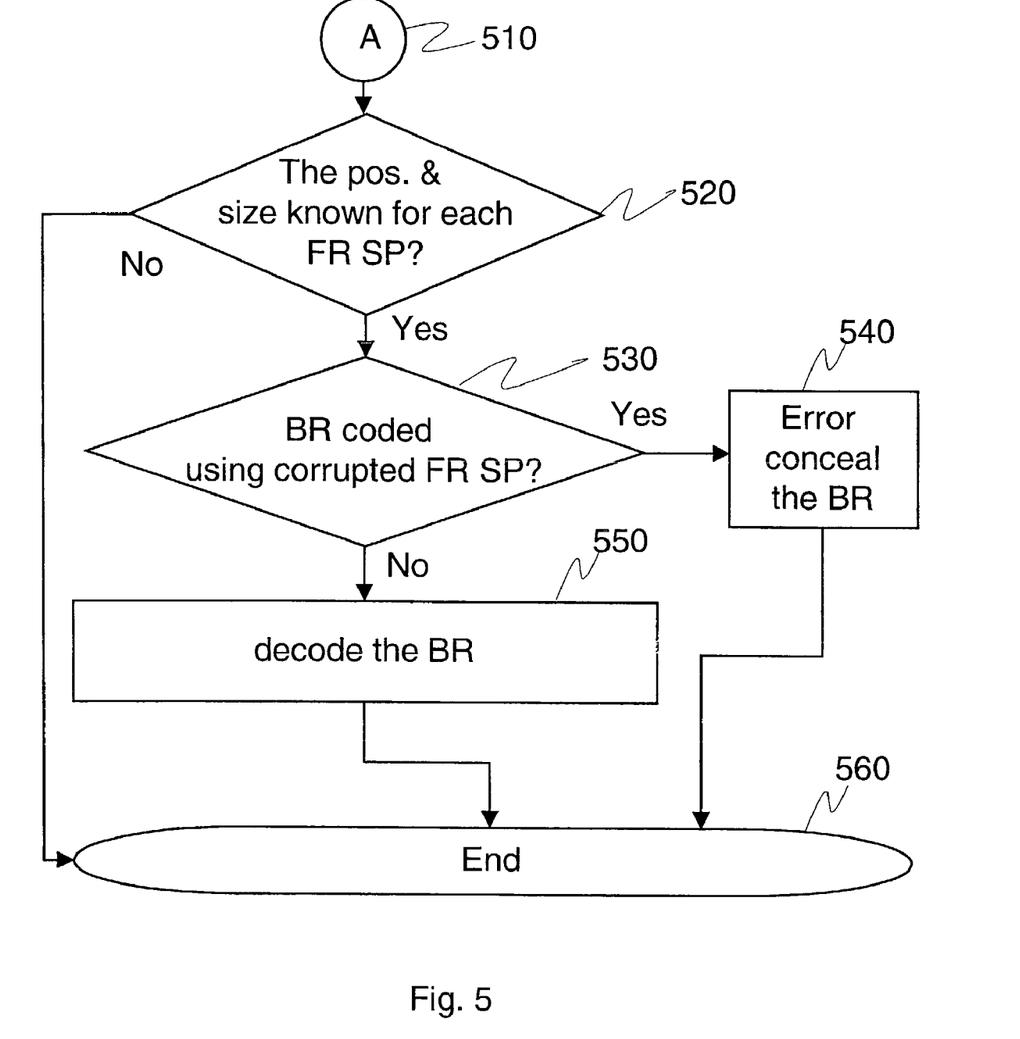
FIG. 5 shows a flowchart of the decoding of a background region according to the preferred embodiment of the invention in case that all foreground region sub-pictures have not been decoded correctly.

FIG. 5 shows a flowchart of the decoding of a BR SP according to the preferred embodiment of the invention in case that all FR SPs have not been decoded correctly. The decoding starts from block 510. In block 520 it is then checked whether the position and size of each FR SP is known. In independent sup-picture decoding mode, the position and size of sub-pictures can be changed only in INTRA pictures (similarly to H.263 Independent Segment Decoding). This fact can be used in practical implementations. The knowledge of the position and size of each FR SP is important for BR SP decoding, since the BR SP can only be determined if the position and size of every FR SP are known. If no, the decoder cannot decode the BR SP at all and the process ends, otherwise the decoder proceeds to block 530. In block 530 it is checked if the BR SP has been encoded using any corrupted FR SP. It may be that the BR SP has been encoded without any reference to the MBs of the FR SP, in which case the answer is bound to be no and the process continues to block 550. In block 550, the BR SP is decoded. However, if the BR SP has been coded using any corrupted FR SP, the process continues from block 530 to block 540, error concealment of the BR SP. Basically, when the position and size of each FR SP is known, the BR SP can be estimated using a previous BR SP and/or present FR SP(s). At simplest, the very previous BR SP may be used as such provided all the FR SPs are the same as with the previous picture with regard to their size and position. In video coding there is typically much of temporal redundancy which allows this type of error concealing. Furthermore, the error concealment of the BR SP can often utilise the coded representation of the BR SP for recovery.

The coding process will next be described with more detail. In the preferred embodiment, two different coding modes can be used for coding the FR SPs: independent SP coding and normal prediction mode. In independent SP coding, boundaries of FR SPs are treated as picture boundaries. The SP segmentation is static over a group of pictures (or any similar grouping of pictures). Both temporal and spatial prediction over the SP boundaries is prevented when coding the FR SPs, to restrain error propagation. The BR SP can however be coded allowing temporal and spatial prediction over the BR SP boundaries, as the BR SP is considered to have a lower subjective importance and it does not need to be protected against error propagation. For example, when motion vectors used in motion compensated video encoding do not point outside the FR SPs. Neither spatial prediction nor loop filtering is allowed across the FR SP boundaries.

The BR SP can thus be predicted using the FR SP and the BR SP cannot be determined at all if any of data packets characterising the FR SP has not been received by the decoder. Consecutively, the decoding of the BR SP need not even be attempted when the size or position of any of the FR SPs cannot be determined, which reduces the power consumption of a decoder. Moreover, since the size and position of the FR SPs are always known before the BR SP is to be decoded, they can well be used as a basis for encoding the BR SP.

The bit-stream syntax according to the preferred embodiment will next be described.

The use of the FR SPs is signaled in the parameter list of picture and sequence layer data, for example as has been suggested in the ITU-T VCEG document VCEG-N72R1, Sep. 26, 2001. The sub-picture feature probably falls out of the scope of the baseline profile and belongs to profiles for error-prone environments only.

When sub-pictures are in use, the slice header is as follows:

| | |
|---|---|
| PictureID | As defined in the aforementioned VCEG-N72-R1. |
| SliceType | As defined in the aforementioned VCEG-N72-R1. |
| FirstMBInSliceX | The horizontal position (column) of the first macroblock in the slice relative to the sub-picture. |
| FirstMBInSliceY | The vertical position (row) of the first macroblock in the slice relative to the sub-picture. |
| InitialQP | As defined in the aforementioned VCEG-N72-R1. |
| SubPictureID | Unique identifier of the sub-picture. Each sub-picture is assigned an ID starting from zero and incremented by one in coding order. The count is reset for each picture. If independent sub-picture coding is in use, sub-picture ID remains the same for the spatially matching sub-pictures over a group of pictures. |
| SubPictureInfo | 0: Sub-picture attributes are the same as the attributes of a sub-picture having the same ID in the previous picture. This value is useful especially in the independent sub-picture coding mode.<br>1: Sub-picture attributes are the same as the attributes of a sub-picture having the same ID in the same picture. This value is used if a sub-picture contains multiple slices.<br>2: Sub-picture location and size is defined in the following four codewords. If independent sub-picture coding is in use, the following four codewords remains the same within a group of blocks. A repetition of the codewords is allowed for error resiliency purposes.<br>3: Background sub-picture. If one of the earlier sub-pictures for the same picture is lost and its location and size are not externally signaled (which is typical in normal prediction mode), decoder does not decode the background sub-picture, as its shape is unknown. |
| Left | The coordinate of the left-most macroblock in the sub-picture (in macroblocks). The left-most macroblock column of the picture is assigned value zero. |
| Top | The coordinate of the top-most macroblock in the sub-picture (in macroblocks). The top-most macroblock row of the picture is assigned value zero. |
| Width | Width of the sub-picture. The codewords are assigned as follows: |

| Symbol no | UVLC code | Explanation |
|---|---|---|
| 0 | 1 | Guess = (RightMost − Left)/2 + 1, where RightMost is the column address of the right-most macroblock of the picture and / stands for division by truncation. For example, for a QCIF picture and Left equal to 3, Width becomes (10 − 3)/2 + 1 = 4. |
| 1 | 001 | Guess + 1 |
| 2 | 011 | Guess − 1 |
| 3 | 00001 | Guess + 2 |
| 4 | 00011 | Guess − 2 |
| ... | ... | ... |

| | |
|---|---|
| Height | Height of the sub-picture. The code words are assigned similarly to Width. |

Applications for the Source Coding Method

One of the major applications for a video encoding and decoding method of the preferred embodiment is transport prioritisation of subjectively important sub-pictures.

The proposed method may improve compression efficiency compared to coding of frequent i.e. fixedly assigned slices. Rectangular sub-pictures often have smooth motion fields or consistent texture, and therefore motion vector and INTRA coding operates better when used on a relatively homogenous sub-picture.

Independent sub-pictures can also be used for picture resolution scalability. Assume that the same QCIF bit-stream, e.g. a multimedia message, is transferred to two handheld devices having a different screen size. One supports sizes up to QCIF (176×144) and the other one up to QQVGA (160×120). There are two conventional possibilities to fit a QCIF picture onto a QQVGA display rectangle: First, the picture can be downscaled, but this may be computationally costly. Second, the picture can be cropped (8 pixels from left and right and 12 pixels from top and bottom), but the cropped pixels must be decoded anyhow. Independent sub-pictures provide yet another solution: The bit-stream could be coded so that there is a 144×112-sized sub-picture centered in the QCIF picture. The bit-stream can be decoded for a QQVGA display rectangle so that only the sub-picture is decoded. Consequently, 36 of the original 99 macroblocks per picture do not have to be decoded.

An example on internet streaming using the preferred embodiment is next described.

Multicast Internet streaming was selected as a target application. The basis for the selection was that the common conditions for the low-delay Internet applications (VCEG-N79R1) could be easily applied to multicast streaming as well.

As interactive error concealment cannot be used in large scale with IP multicast, forward error control methods were used. The methods can be applied in transport coding level (FEC packets, packet duplication) or in source coding level (INTRA macroblock updating). Three cases were considered:

1. Relatively long (1 second, or 10 frames at a frame rate of 10 frames/second) initial buffering before starting playback in clients. Reed-Solomon forward error coding used.
2. Moderate amount (2 frames) of initial buffering before starting playback in clients. Parity forward error coding according to RFC 2733 used.
3. Moderate amount (2 frames) of initial buffering before starting playback in clients. No transport-level forward error coding.

While the best results can be achieved with case 1, clients may lack the required buffering capabilities. Furthermore, Reed-Solomon FEC packets have not been standardized (as far as we know). Thus, results were also provided for a simple parity FEC based scheme (case 2), which should be easy enough to implement in most practical systems. However, some systems, such as the 3GPP packet-switched streaming service (release 4), do not include support for parity FEC, and therefore case 3 was added to the test set too.

Test Conditions

The codecs:

The coding method of the preferred embodiment of the invention was implemented based on TML-8.6, a temporary version of TML-8.5 plus the error concealment implementation (VCEG-N62). It was called as a rectangular sub-picture (RSP) codec. The performance of RSP codec was compared to the conventional codec 1 (TML-86 plus region-of-interest quantization) and the conventional codec 2 (TML-86, without region-of-interest quantization).

Codec parameters:
Motion vector resolution: ⅛ pel
Hadamard transform: used
Max search range: 16
Number of previous frames used for inter motion search: 5
All the block types enabled.
Slice mode: Fixed number of MB per slice
B-frames and SP-frames: not used
Symbol mode: CABAC
Data partition: 1 partition per slice
Sequence header: no sequence header
Search range restrictions: no
Rate-distortion optimized mode decision: on
Constrained intra prediction: not used
Change QP: not used
Additional reference frame: not used
Other conditions:
Instead of encoding 4000 frames as specified in VCEG-N79R1, the PSNR of the decoded video is calculated for each of the 10 runs, the average PSNR plus the best and worst cases of the 10 runs are shown, as proposed in VCEG-M77. This method is used to show the variation of the PSNR depending on the position of the loss pattern files. In the simulation, the beginning loss position of the run with order n+1 continuously follows the ending loss position of the nth run.

A constant packetization overhead (40 bytes/packet) is assumed as in VCEG-N79R1. The packetization overheads of all the packets, including the FEC packets, are subtracted from the available total bitrate to calculate the available video bitrate.

Since no rate control strategy is implemented in current TML software, we acquire the desired bit rates according to the bit allocation method described in subsection 4.4.

As specified in VCEG-N79R1, PSNR is calculated between each and every frame of the source sequence (at full frame rate), and the corresponding reconstructed frame.

INTRA GOB updates were used instead of a macroblock mode selection mechanism.

Test Sequence and Segmentation

The experiments were done with the Carphone sequence. The QCIF version of the sequence was used. It was coded at a frame rate of 10 fps. The target total bit-rate was 64 kbps. The number of encoded frames was 101 (303 frames of the Carphone sequence, skipped by 2).

The foreground sub-picture was selected manually and covered the head of the fellow appearing in the series in all the pictures of a video clip. In the conventional codec 1, the area for the foreground sub-picture was selected as the region of interest that was quantised finer than the rest of the picture. A constant 64×64 foreground sub-picture was used throughout the sequence. The independent sub-picture coding mode was in use.

Packetization and Forward Error Correction

In all the cases, the sizes of the RS FEC packets are assumed to equal to the largest size of the packets that were protected with the RS FEC packets. If m FEC packets are coded for each block of n video packets, the coding scheme is notated as RS(n,m). The FEC scheme is able to correct a loss of up to m packets (any combination of the video packets and the FEC packets) per each block.

Case 1: 10 Frames Buffered with RS FEC

The RSP codec (only one foreground sub-picture):
For the intra picture, there are 4 packets: 2 packets for the foreground sub-picture (GOB interleaving applied), 1 RS(2,1) packet for the 2 foreground packets, and 1 packet for the background sub-picture.

For inter pictures, 10 frames consist a group. For each group, there are 10 foreground sub-picture packets, m (m is variable) RS(10,m) packets for the foreground packets, and 10 background sub-picture packets. Note that the packetization method for the foreground and the background is an interleaving method: the even number of GOBs of frame n and the odd number of GOBs of frame n+1 are in one packet, and vice versa.

The Conventional Codecs:
For the intra picture, there are 3 packets: 2 GOB interleaving packets for the entire picture, and 1 RS(2,1) packet.

For inter pictures, 10 frames consist a group. For each group, there are 20 packets, each of which contain every other GOB of a particular frame, and m (m is variable) RS(20,m) packets.

Case 2: 2 Frames Buffered with Parity FEC

Note that the result of the parity FEC for 2 packets is the same as the result of RS(2,1). Therefore, to simplify documenting, the parity FEC is considered to be the same as RS(2,1).

The RSP codec (only one foreground sub-picture):
For the intra picture, the same as in case 1.
For inter pictures, 2 frames consist a group. For each group, there are 2 foreground sub-picture packets, 1 RS(2,1) packet for the foreground packets, and 1 background sub-picture packets. The packetization method for the foreground and the background is the same as in case 1.

The Conventional Codecs:
For the intra picture, the same as in case 1.
For inter pictures, each frame has 3 packets: 2 GOB interleaving packets, and 1 RS(2,1) packets.

Case 3: 2 Frames Buffered Without FEC
All the codecs use the same packetiztion method as in case 2. The only difference is that there is no FEC packet.

Bit Allocation

The bit rate is decided by several factors: the intra GOB update (IGU) rate, the FEC rate, the slicing method, and QP. (Note that prediction from outside the intra updated GOB should be prevented when non-GOB shaped slice is used. For GOB shaped slice, the prediction prevention is done by the slice prediction limitation.) In the simulations, the former 3 factors, if variable, are optimized by trial and error. QP is adjusted when other factors are fixed, as follows:

QP or QP pair for region of interest (ROI) encoding is fixed for the whole sequence.

For the conventional codec without ROI encoding, QP is adjusted directly to meet the available video bit rate as closely as possible.

For the RSP codec or the conventional codec with ROI encoding, the QP pair is adjusted as follows (QPf is for foregruond, and QPb is for background):

First decide QPf. Set QPb to be the maximum (31), adjust QPf to meet the available video bit rate as close as possible.

Then refine QPb. Let QPf be fixed as decided above, adjust QPb to meet the available video bit rate as close as possible.

Results

Objective Results

Only the optimized results are presented here. When optimizing the IGU rate, the FEC rate and the slicing method, no range limitations are put on them. The largest ranges decided by the codecs are used. That is, IGU rate range is from 0 to 1 GOB/frame, the FEC rate (m in RS(n,m)) is from 0 (no upper limit), and the slicing is from 1 to 9 (the maximum for QCIF sequence) GOB/slice.

Results of the three cases were obtained. In the following discussion, PLR denotes the packet loss rate and IGUf and IGUb are respectively IGU of the foreground and background sub-pictures. The unit for IGU rate is GOB/frame.

The results showed that:
In each case, the proposed RSP codec has the best PSNRs for the foreground region, and the conventional codec with ROI coding is better than the conventional codec without ROI. In case 1, the average PSNR of the RSP codec is 0.78 dB to 0.96 dB higher than the convention codec with ROI coding, and 1.94 dB to 2.40 dB higher than the conventional codec without ROI coding; In case 2, the improvements are 1.09 dB to 1.59 dB and 2.04 dB to 2.38 dB, respectively; In case 3, the improvements are respectively 0.28 dB to 1.52 dB and 1.28 dB to 1.86 dB when PLR is non-zero.

If relatively long sequences are buffered (case 1), proper RS FEC can recover all packet losses in PLRs 3%, 5%, and 10%, and most packet losses in PLR 20%.

In case 3 the RSP codec is better than the conventional codecs. One reason is that the foreground region using RSP codec has larger IGU rate. For QCIF sequence, there are 9 GOBs per frame. Therefore IGU=1 means that the real IGU rate is ⅑. For the foreground sub-picture (assume it has 6 lines of MBs), IGU=1 means that the real IGU rate is ⅙. In current TML software, the maximum IGU is 1. However, from the presented results, we can infer that larger IGU rate or other intra update method should be developed.

Subjective Results

For each case, the sequence was chosen which had the PSNR values closest to the average ones as the representative sequence for subjective evaluations.

Even though snapshots do not give a complete idea of the behavior of different schemes, they capture some aspects. Snapshots of the last decoded picture for the 0%, 5%, and 20% packet loss rate and for the proposed coding scheme were examined.

The snapshots showed that the conventional coding scheme with a constant QP looks clearly worst in all cases. They also show that the area of interest in the proposed coding scheme is subjectively better than in the other schemes. This can be seen most clearly when no FEC packets are used in the 20% loss rate case.

In general, the presented snapshots are in line with the fact that losses are recovered by FEC packets and INTRA GOB updates relatively soon (as there are hardly any visible errors in the snapshots).

Figure 6:
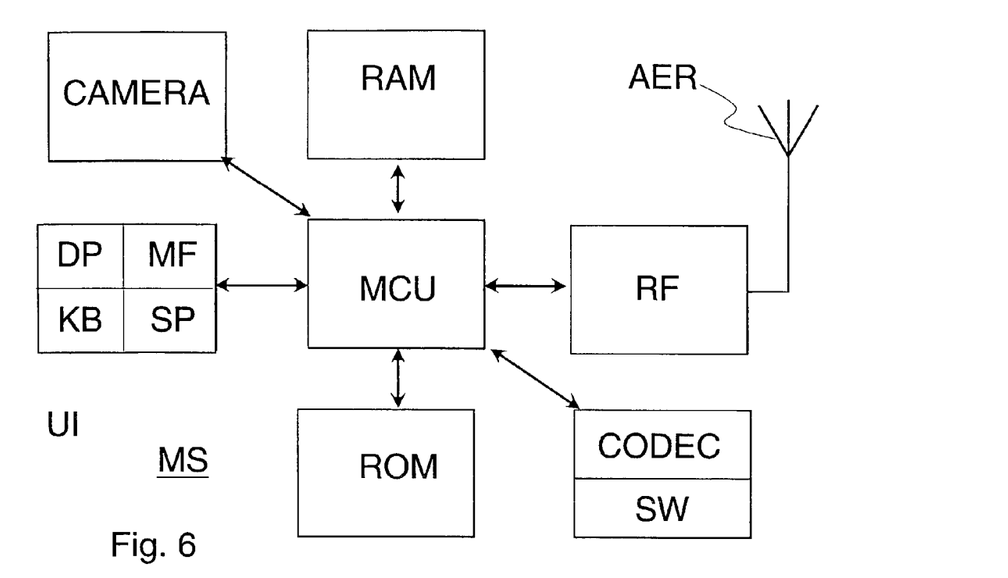
FIG. 6 shows a block diagram of a mobile communication device according to the preferred embodiment of the invention.

FIG. 6 shows a block diagram of a mobile communication device MS according to the preferred embodiment of the invention. In the mobile communication device, a Master Control Unit MCU controls blocks responsible for the mobile communication device's various functions: a Random Access Memory RAM, a Radio Frequency part RF, a Read Only Memory ROM, video codec CODEC and a User Interface UI. The user interface comprises a keyboard KB, a display DP, a speaker SP and a microphone MF. The MCU is a microprocessor, or in alternative embodiments, some other kind of processor, for example a Digital Signal Processor. Advantageously, the operating instructions of the MCU have been stored previously in the ROM memory. In accordance with its instructions (i.e. a computer program), the MCU uses the RF block for transmitting and receiving data over a radio path. The video codec may be either hardware based or fully or partly software based, in which case the CODEC comprises computer programs for controlling the MCU to perform video encoding and decoding functions as required. The MCU uses the RAM as its working memory. The mobile communication device can capture motion video by the video camera, encode and packetise the motion video using the MCU, the RAM and CODEC based software. The RF block is then used exchange encoded video with other parties.

Figure 7:
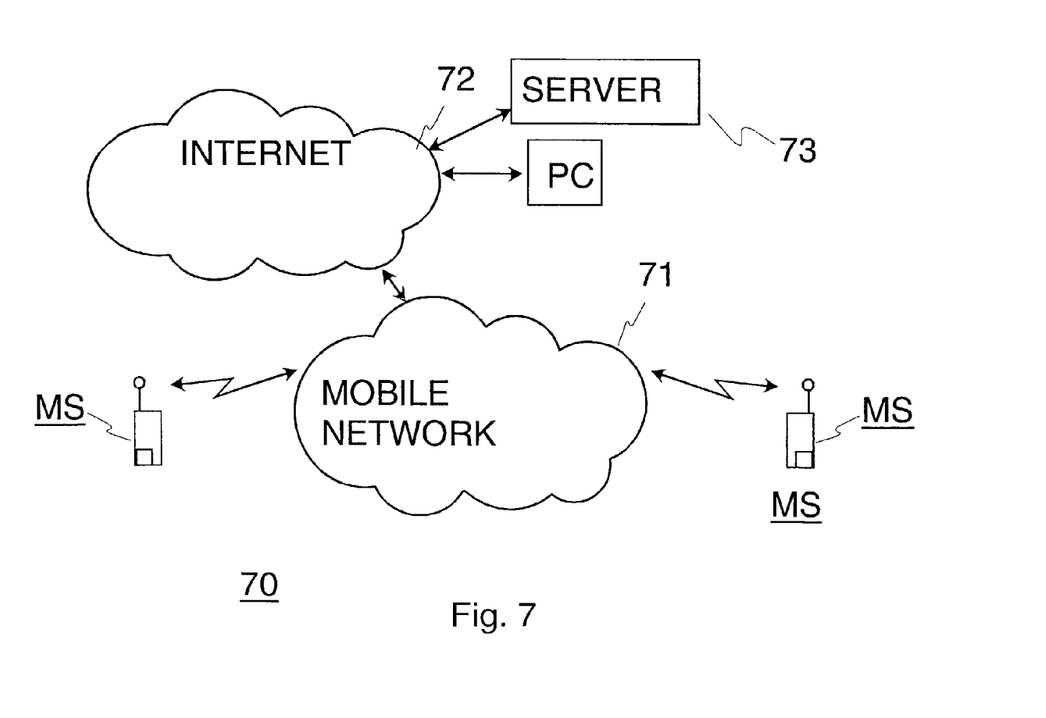
FIG. 7 shows a system according to the preferred embodiment of the invention.

FIG. 7 shows video communication system 70 comprising a plurality of mobile communication devices MS, a mobile telecommunications network 71, the Internet 72, a video server 73 and a fixed PC connected to the Internet. The video server has a video encoder and can provide on-demand video streams such as weather forecasts or news.

The preferred embodiment of the invention is based on a region-based coding scheme. Unlike MPEG-4 video, it does not require any complicated processing of arbitrary shaped regions in video encoding and decoding and therefore it is well applicable to handheld devices. The preferred embodiment of the invention provides a robust video coding and decoding tool to enable transport prioritisation and to achieve a subjectively better picture quality in error-prone video communication systems.

The preferred embodiment may be applied in various contexts, for example in the context of the ITU-T H.26L video coding standard. Particular implementations and embodiments of the invention have been described. It is clear to a person skilled in the art that the invention is not restricted to details of the embodiments presented above, but that it can be implemented in other embodiments using equivalent means without deviating from the characteristics of the invention. The scope of the invention is only restricted by the attached patent claims.

Abbreviations:

| Abbreviations: | |
| --- | --- |
| AVO | Audio-Visual Object |
| BR | Background Region |
| CABAC | Context-based Adaptive Binary Arithmetic Coding |
| DCT | Discrete Cosine Transform |
| DPL | Data Partitioning Layer |
| FEC | Forward Error Correction |
| FR | Foreground Region |
| GOB | Group Of Blocks |
| IGU | intra GOB update |
| ITU | International Telecommunication Union |
| MB | Macroblock |
| MPEG | Moving Picture Expert Group |
| NAL | Network Adaptation Layer |
| QCIF | Quarter Common Intermediate Format |
| QP | Quantisation Parameter |
| QPb | Quantisation Parameter for background |
| QPf | Quantisation Parameter for foreground |
| QQVGA | video format with 160 × 120 pixels |
| ROI | Region Of Interest |
| RS | Reed-Solomon |
| RSP | Rectangular Sub-Picture |
| RTP | Real-time Transport Protocol |
| SEI | Supplemental Enhancement Information |
| SP | Sub-Picture |
| TML | Test Model Long-term |
| UVLC | Universal Variable Length Code |
| VCL | Video Coding Layer |
| VO | Video Object |
| VOL | Video Object Layer |
| VOP | Video Object Plane |
| YUV | three colour components |

The invention claimed is:

1. A method of video encoding comprising the steps of:
dividing a picture into a set of regular shaped coding blocks having a predetermined alignment in relation to the area of the picture, each coding block corresponding to at least one group of elementary coding elements;
determining at least one shape within a picture;
selecting at least one subset of the coding blocks defining at least one area covering the at least one determined shape;
determining as at least one separate coding object the selected at least one subset of the coding blocks;
determining as a background object the subset of the coding blocks that corresponds to the part of the picture that excludes the at least one separate coding object;
encoding the at least one separate coding object; and
encoding as one coding object the background object, wherein the encoding the background coding object comprises the sub-step of defining coding slices in a scan-order so that the slices are composed by consecutive coding blocks skipping those basic coding objects which are included in the at least one separate coding object.

2. A method according to claim 1, wherein the background coding object is coded using the at least one separate coding object.

3. A method according to claim 1, wherein the area covering the at least one determined shape is a rectangular area, whereby square is one subset of rectangles.

4. A method according to claim 1, wherein the separate coding objects are defined in a descending order of subjective importance.

5. A method according to claim 1, wherein the video encoding of the at least one separate coding object is independent of the video encoding of the background object so as to inhibit error propagation into the at least one separate coding object.

6. A method according to claim 1, wherein the method further comprises the step of assigning a different identifier to the at least one separate coding object for correlating each of the at least one separate coding object and corresponding characteristics.

7. A method of video encoding comprising the steps of:
dividing a picture into a set of regular shaped coding blocks having a predetermined alignment in relation to the area of the picture, each coding block corresponding to at least one group of elementary coding elements;
determining at least one shape within a picture;
selecting at least one subset of the coding blocks defining at least one area covering the at least one determined shape;
determining as at least one separate coding object the selected at least one subset of the coding blocks;
determining as a background object the subset of the coding blocks that corresponds to the part of the picture that excludes the at least one separate coding object;
encoding the at least one separate coding object, wherein the encoding the at least one separate coding object further comprises the sub-step of defining within each separate coding object coding slices in a scan-order so that the slices are composed in the scan-order of coding blocks included in the at least one separate coding object; and
encoding as one coding object the background object.

8. A method of video decoding a picture coded by a set of coding blocks, each coding block corresponding to at least one group of the elementary coding elements and the coding blocks having a predetermined alignment in relation to the area of the picture, the method comprising the steps of:
determining at least one separate coding object corresponding to at least one subset of the coding blocks defining at least one part of a picture being decoded;
determining as a background object the subset of the coding blocks that corresponds to the part of the picture that excludes the at least one separate coding object;
determining video decoding slices for the background object. comprising the sub-steps of forming a decoding slice of consecutive coding blocks and skipping the coding blocks which belong to any of the separate coding object;
decoding the at least one separate coding object; and
decoding the background object.

9. A method according to claim 8, wherein the video decoding of the at least one separate coding object is independent of the video decoding of the background object.

10. A method according to claim 8, wherein the at least one separate object corresponds to at least one foreground region.

11. A video decoder for video decoding a picture coded by a set of coding blocks, each coding block corresponding to at least one group of the elementary coding elements and the coding blocks having a predetermined alignment in relation to the area of the picture, the video decoder comprising:

means for determining at least one separate coding object corresponding to at least one subset of the coding blocks defining at least one part of a picture being decoded;

means for determining as a background object the subset of the coding blocks that corresponds to the part of the picture that excludes the at least one separate coding object;

means for determining video decoding slices for the background object;

means for forming a decoding slice of consecutive coding blocks and skipping the coding blocks which belong to any of the separate coding object;

means for decoding the at least one separate coding object; and     means for decoding as one coding object the background object.

12. A video decoder according to claim 11, wherein the video decoding of the at least one separate coding object is independent of the video decoding of the background object.

13. A video decoder according to claim 11, wherein the at least one separate object corresponds to at least one foreground region.

* * * * *